(12) United States Patent
Crawford et al.

(10) Patent No.: US 9,835,211 B2
(45) Date of Patent: *Dec. 5, 2017

(54) BRAKE ASSEMBLY

(71) Applicant: Ausco Products, Inc., Benton Harbor, MI (US)

(72) Inventors: Norman D. Crawford, Saint Joseph, MI (US); Brian P. Dennis, Kalamazoo, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,881

(22) Filed: Jan. 7, 2016

(65) Prior Publication Data
US 2016/0116007 A1   Apr. 28, 2016

Related U.S. Application Data

(63) Continuation of application No. 13/231,168, filed on Sep. 13, 2011, now Pat. No. 9,249,846.

(51) Int. Cl.
*F16D 55/24* (2006.01)
*B60B 27/06* (2006.01)
(Continued)

(52) U.S. Cl.
CPC ............. *F16D 55/24* (2013.01); *B60B 27/06* (2013.01); *B60T 1/065* (2013.01); *F16D 55/36* (2013.01); *B60B 7/0013* (2013.01); *B60B 27/0005* (2013.01); *B60B 27/0052* (2013.01); *B60B 27/0073* (2013.01); *B60B 2900/113* (2013.01); *B60B 2900/5112* (2013.01); *F16D 2055/0033* (2013.01); *F16D 2121/04* (2013.01);
(Continued)

(58) Field of Classification Search
CPC .......... F16D 55/24; F16D 55/36; F16D 55/38; F16D 55/40; F16D 65/005; F16D 65/0056; F16D 2055/0008; F16D 2055/0033; F16D 2121/04; F16D 2121/14; F16D 2123/00; F16D 2125/38; B60B 27/0052
See application file for complete search history.

(56) References Cited

U.S. PATENT DOCUMENTS 2,934,177 A * 4/1960 Heck ........................ F16D 55/36
                                                                188/152
2,953,040 A * 9/1960 Christenson ............ F16D 55/46
                                                                188/152

(Continued)

*Primary Examiner* — Thomas J Williams
(74) *Attorney, Agent, or Firm* — Renner, Kenner, Greive, Bobak, Taylor & Weber

(57) ABSTRACT

A brake assembly adapted to be mounted to the flange of an axle housing. The brake assembly includes a stationary plate having a plurality of threaded holes therein. The brake assembly also includes a mounting sleeve positioned adjacent to the axle housing flange opposite the stationary plate. A plurality of holes are provided through the mounting sleeve and are aligned with the threaded holes in the stationary plate. A bolt is received through each of the holes in the mounting sleeve and the aligned holes in the axle housing flange and the threaded holes in the stationary plate to secure the brake to the axle housing. The mounting sleeve may be provided in two or more separate pieces in order to facilitate installation.

16 Claims, 7 Drawing Sheets

(51) Int. Cl.
  *F16D 55/36* (2006.01)
  *B60T 1/06* (2006.01)
  *B60B 7/00* (2006.01)
  *B60B 27/00* (2006.01)
  *F16D 121/04* (2012.01)
  *F16D 121/14* (2012.01)
  *F16D 123/00* (2012.01)
  *F16D 125/38* (2012.01)
  *F16D 55/00* (2006.01)

(52) U.S. Cl.
  CPC ...... *F16D 2121/14* (2013.01); *F16D 2123/00* (2013.01); *F16D 2125/38* (2013.01)

(56) References Cited

U.S. PATENT DOCUMENTS

| | | | | |
|---|---|---|---|---|
| 3,344,893 A | * | 10/1967 | Pelikan | B61H 5/00 188/58 |
| 4,140,198 A | * | 2/1979 | Chamberlain | B60K 17/046 180/370 |
| 9,249,846 B2 | * | 2/2016 | Crawford | B60B 27/06 |
| 2013/0038005 A1 | * | 2/2013 | Kerr | F16F 15/02 267/136 |

* cited by examiner

BRAKE ASSEMBLY

CROSS-REFERENCE TO RELATED APPLICATION

This application is a continuation of U.S. patent application Ser. No. 13/231,168 filed on Sep. 13, 2011, which is incorporated herein by reference in its entirety.

TECHNICAL FIELD

This invention relates to a brake assembly adapted to mount to an axle housing on a vehicle. More particularly, this invention relates to such a brake including mounting sleeves to facilitate mounting the brake to the mounting flange on the axle housing of a vehicle.

BACKGROUND ART

A variety of braking systems are known and commercially available, and are used on all types of vehicles. For example, caliper brakes utilize opposed brake pads to apply a stopping force to the planar surfaces of a rotating disc. Similarly, drum brakes rely upon brake shoes to apply a stopping force to the interior of a rotating drum. Multi-disc brakes utilize a plurality of alternating stationary and rotating discs that, when compressed together, apply a braking force on a rotating hub or axle. In each case, the brakes must be mounted to the vehicle adjacent to one or several rotating wheels. Small openings near the wheels and the presence of other vehicle components can make mounting the brake in the desired position difficult, and can sometimes restrict the size or type of the brake that may be used on a specific vehicle. Available locations for mounting the brake must also be taken into consideration.

In some vehicles the brakes are adapted to be mounted to the axle housing via a mounting flange extending from a distal end of the housing. A rotating hub is typically located outside the axle housing, and the brake must be adapted to apply a stopping force to the rotating hub or a drum that is rotationally secured to the hub. One such axle is the Model 18 axle manufactured by Dana Holding Corporation of Maumee, Ohio. Such a conventional brake and axle assembly is shown in FIG. 1, and includes an axle A and a rotating hub H positioned on the end of axle A. A drum D is rotationally secured to hub H, and therefore rotates with axle A. A brake B is secured around hub H and includes brake shoes S that, when actuated, apply a braking force to the interior of rotating drum D. An axle housing X is positioned around axle A and includes a flange F at an end thereof adjacent hub H. A plurality of holes extend through flange F and are adapted to receive a plurality of bolts to secure brake B to axle housing X. Brake B includes a stationary plate P having holes that align with the holes through flange F and that acts to secure the brake to the axle housing.

Due to the size of flange F, the mounting bolts extending therethrough must include a head having a flat portion Z on an outer radial surface so that the bolt may be fully inserted through the hole in the flange without engaging the axle housing X. Because the bolt cannot rotate within the hole, a nut must be positioned on the interior of brake B to secure the brake to the axle housing. The use of unique bolts to secure brake B to axle housing X increases costs, and also may make finding replacements difficult in some instances. In addition, the inclusion of a nut on the interior of brake B makes mounting or removal of brake B more difficult, and effectively limits the types of brakes that may be used. A wet brake, including lubricating and cooling oil in the interior of the brake, would present significant problems if such a mounting assembly were included. Access to the interior of the brake to allow for mounting or removal of the brake would require that all brake fluid first be drained from the brake.

Conventional brake assemblies, as shown in FIG. 1, also suffer from the disadvantage of not having an effective seal to prevent water and dirt intrusion into the internal braking area. Such a braking assembly includes only one gasket G that is compressed between the stationary plate P and a rotating journal J of the hub H. The gasket G fails to prevent water intrusion into the spline of the wheel hub H. The water that enters the spline of the wheel hub may then travel to the axle bearings in the axle housing. Water intrusion decreases both bearing and brake life.

Thus, there is a need for an improved brake assembly that solves one or more of the deficiencies of the prior art.

DISCLOSURE OF THE INVENTION

It is thus an object of one aspect of the present invention to provide a brake having an improved mounting assembly.

It is an object of another aspect of the present invention to provide a brake, as above, having mounting sleeves secured to one side of an axle flange.

It is an object of an additional aspect of the present invention to provide a brake, as above, which includes threaded holes extending into a portion of the brake housing.

It is an object of yet another aspect of the present invention to provide a brake, as above, which is provided with an improved sealing assembly to prevent water infiltration into the interior of the braking cavity.

These and other objects of the present invention, as well as the advantages thereof over existing prior art forms, which will become apparent from the description to follow, are accomplished by the improvements hereinafter described and claimed.

In general, a brake assembly according to the concepts of the present invention is adapted to be mounted to a flange of an axle housing, the flange including a plurality of holes therethrough. The brake includes a stationary plate having a plurality of threaded holes. The brake also includes a mounting sleeve positioned adjacent to the axle housing flange on a side opposite the stationary plate, and a plurality of holes through the mounting sleeve. A plurality of bolts having a threaded portion and a head are received in the holes in the mounting sleeve, the holes through the axle housing flange, and the threaded holes in the stationary plate to secure the brake to the axle housing.

In accordance with another aspect of the present invention, a wheel hub assembly includes an axle, an axle housing having a flange, and a brake assembly secured to the axle housing flange. The brake assembly includes a stationary plate having a plurality of threaded holes. A mounting sleeve is positioned adjacent to the axle housing flange on a side opposite the stationary plate, and a plurality of holes are provided through the mounting sleeve. A plurality of bolts having a threaded portion and a head are received in the holes in the mounting sleeve, the holes through the axle housing flange, and the threaded channels to secure the brake to the axle housing.

In accordance with another aspect of the present invention, a brake assembly is adapted to be mounted to a flange of an axle housing. The brake assembly includes a brake housing having a stationary plate and a plurality of threaded holes extending partially through the stationary plate. A generally annular mounting sleeve is adapted to be positioned around the axle housing on a side of the flange opposite the stationary plate, the mounting sleeve including more than one piece. A plurality of holes are provided through the mounting sleeve and are aligned with the threaded holes in the stationary plate. A plurality of bolts having a threaded end are received in the holes in the mounting sleeve and the threaded holes in the stationary plate to secure the brake housing to the axle housing.

A preferred exemplary brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
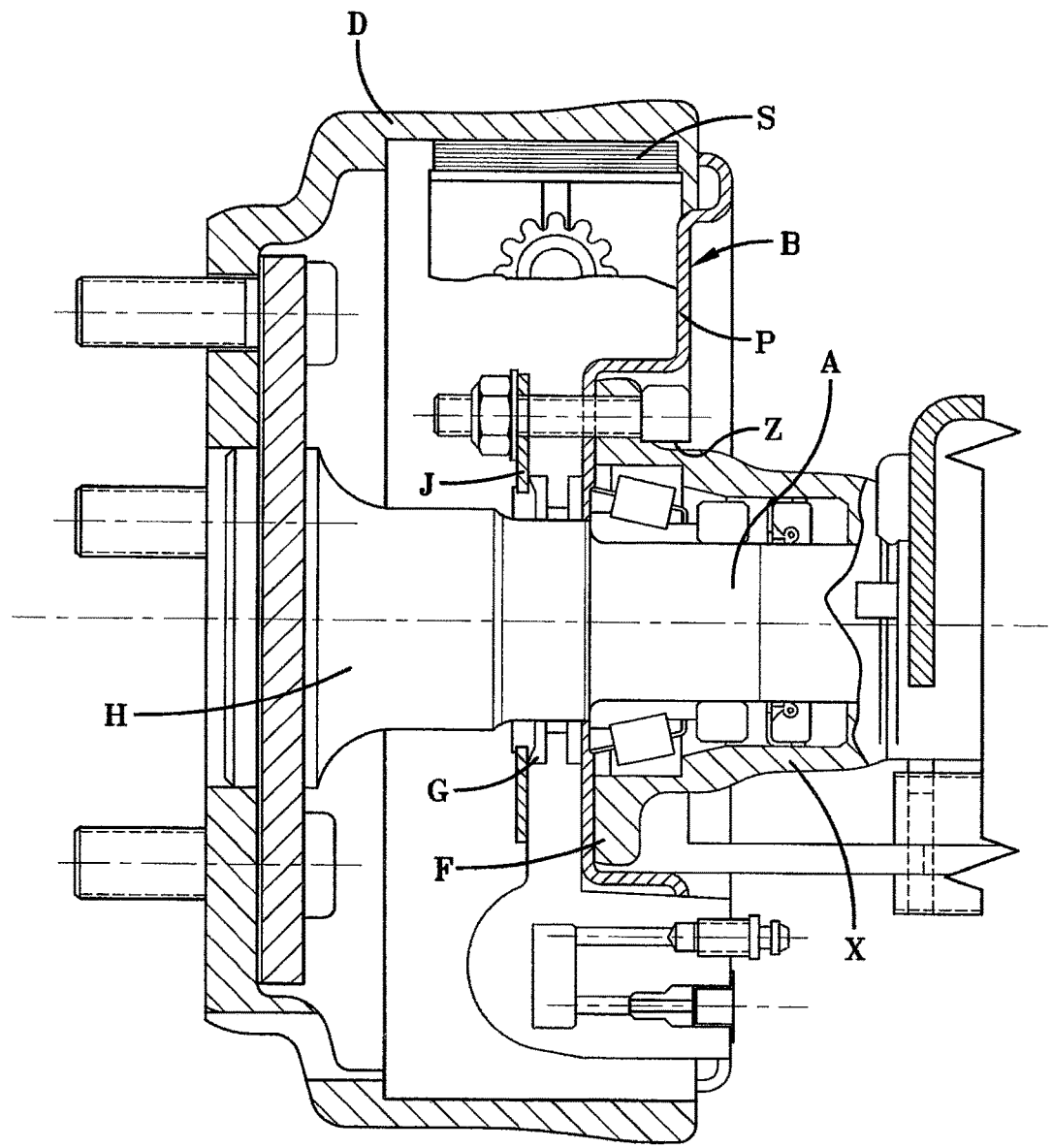
FIG. 1 is a sectional view of a prior art brake and mounting assembly.

A brake made in accordance with the present invention is indicated generally by the numeral 10. Brake 10 is mounted to an axle housing 12 that surrounds and substantially encloses an axle 14. A hub 16 and a brake 10 are rotationally secured on each end of the vehicle axle 14, although only a single hub and brake is shown in the drawings. It will be appreciated by those skilled in the art that the axle, hub and brake assemblies at opposing ends of the vehicle axle 14 are identical except for the orientation of the components. Axle 14 includes a splined section 15 on an exterior surface, and hub 16 includes a splined section 17 on an interior surface, the splines 15 of the axle and the splines 17 of the hub engaging one another to rotationally couple the two components together. An end of hub 16 includes a plurality of lug bolts 18 adapted to receive a vehicle wheel thereon, as is well known in the art.

Brake 10 includes a stationary plate 20 that is secured to axle housing 12 and is positioned around hub 16. Stationary plate 20 is generally circular in shape and includes a central bore therethrough. A bearing 22 is provided between stationary plate 20 and hub 16 to allow the hub to rotate independent of the stationary plate. Stationary plate 20 may include a variety of recesses and/or projections extending in an axial direction to accommodate other brake components. A lip 24 extends generally orthogonally from the outer radial edge of stationary plate 20 in a direction opposite axle housing 12.

A bowl-shaped cover plate 26 is positioned around hub 16 and engages stationary plate 20 to define a portion of a fluid-tight inner chamber 28. The stationary plate 20 and the cover plate 26 together form a brake housing that encloses other brake components. Cover plate 26 includes an inner axially extending neck 30 adjacent hub 16, a generally planar radial body 32 and an axially extending arm 34 positioned at on outer radial edge of body 32. Cover plate 26 is sized so that arm 34 is positioned interiorly of lip 24 of stationary plate 20. A sealing member 36 is provided between arm 34 and lip 24 to create a fluid-tight seal therebetween. A bearing 38 is provided between hub 16 and neck 30 of cover plate 26 to allow rotation of the hub independent of the cover plate. In addition to sealing member 36, sealing members 40 and 42 are provided between cover plate 26 and hub 16, and between stationary plate 20 and hub 16, respectively. Sealing members 36, 40 and 42, along with stationary plate 20, cover plate 26 and hub 16, define the fluid-tight inner chamber 28.

Figure 2:
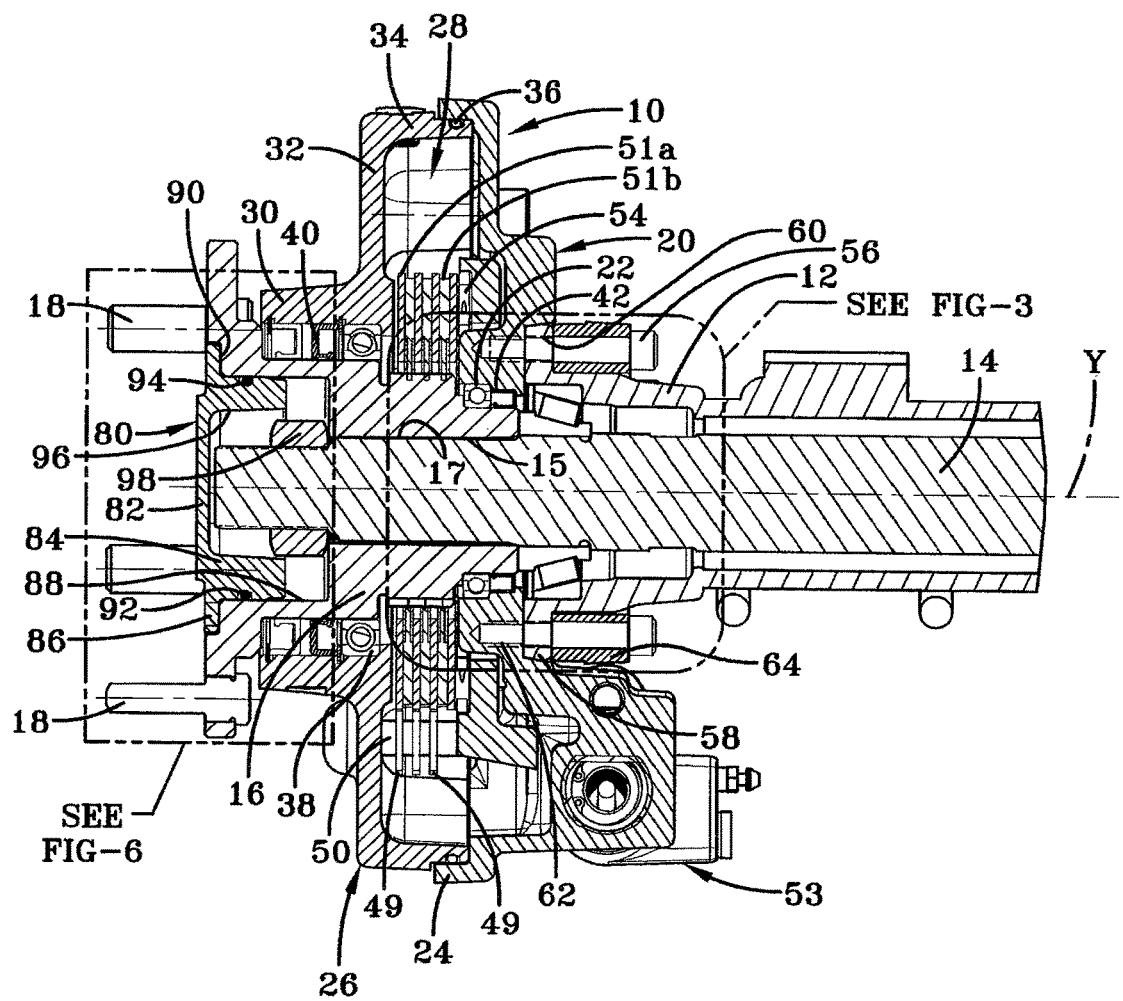
FIG. 2 is a sectional view of the brake assembly and a portion of an axle according to the concepts of the present invention.
Figure 3:
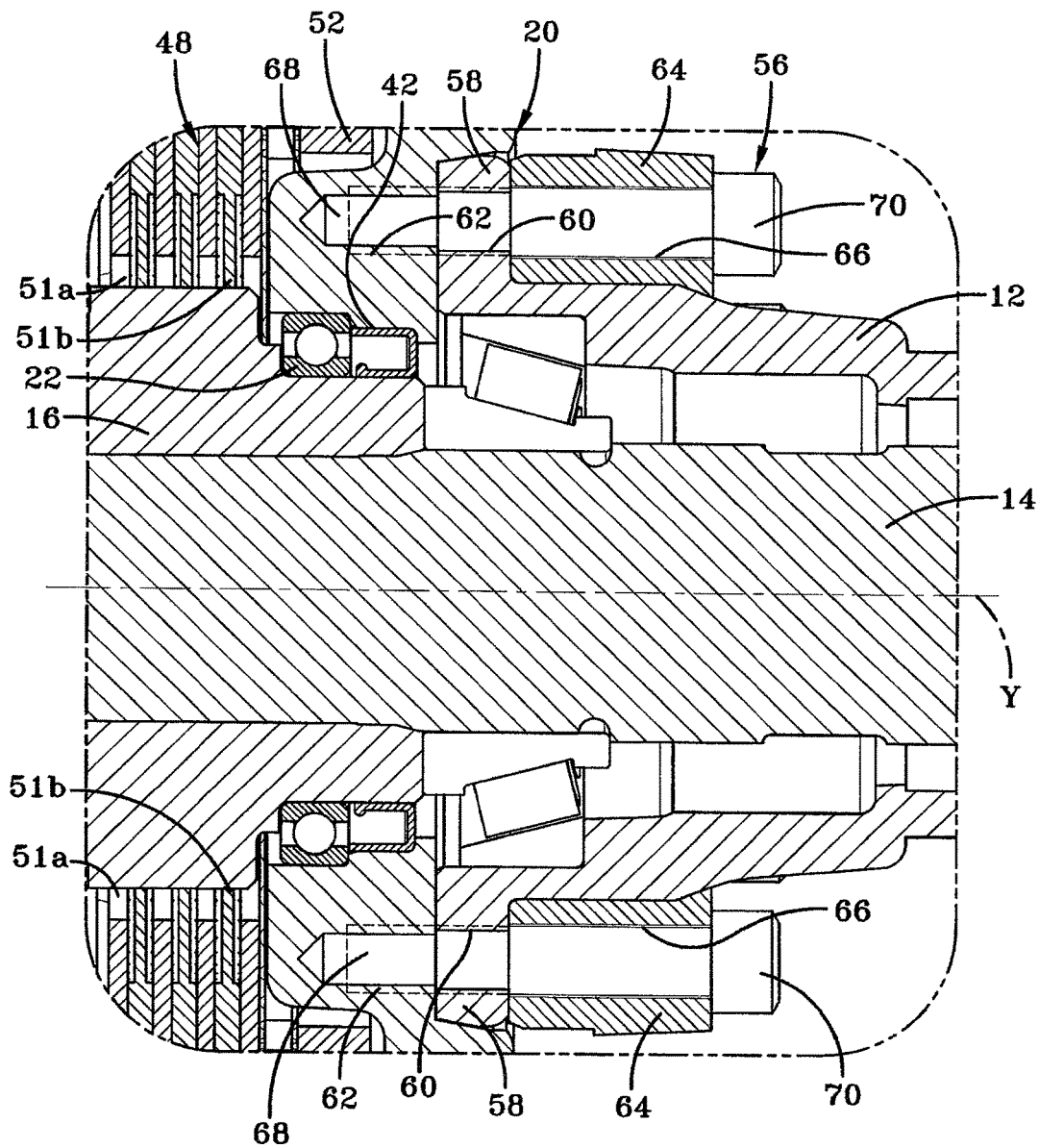
FIG. 3 is an enlarged sectional view of a portion of the brake assembly as indicated in FIG. 2.

A conventional disc stack 48 is provided within inner chamber 28. As such, disc stack 48 includes a plurality of alternating stationary discs 51a and rotating discs 51b (FIG. 2). The rotating discs include internal splines and are rotationally secured around hub 16, which includes external splines. The stationary discs are also positioned around hub 16 but are not rotationally engaged therewith. Instead, the stationary discs are prevented from rotational movement by an anchor. For example, each stationary disc may include an ear 49, and a bolt or other projection 50 may be received through each ear 49 and may be secured to stationary plate 20 and/or cover plate 26 to prevent rotation of the stationary discs 51a. Both the rotating discs 51b and stationary discs 51a are free to move axially along hub 16. The rotating discs 51b include a high friction surface thereon so that a braking force is created when the disc stack 48 is compressed and the stationary discs 51a contact the high friction surface of the rotating discs 51b, as is known to those skilled in the art.

Any actuating mechanism known to those skilled in the art may be employed to actuate brake 10 and compress disc stack 48. The embodiment depicted in the drawings includes a ball ramp actuating mechanism. The ball ramp actuator includes a rotatable actuator 52 that is positioned within inner chamber 28 adjacent to disc stack 48. As is known in the art, rotatable actuator 52 and stationary plate 20 each include a plurality of depressions of decreasing depth, and balls positioned between opposing depressions. A hydraulic cylinder assembly 53 engages rotatable actuator 52 causing it to rotate about an axis Y, thereby causing the balls positioned within the depressions to move along the depressions toward the shallower ends. This rotation causes rotatable actuator 52 to move axially away from stationary plate 20, thereby inducing compression of disc stack 48. A needle bearing 54 may be positioned between rotatable actuator 52 and disc stack 48 to prevent the transfer of rotational movement between the disc stack 48 and the rotatable actuator 52. Such a ball ramp actuating mechanism is disclosed in more detail in U.S. Pat. No. 7,735,612, which is incorporated herein by reference for the purpose of teaching the operation of a ball ramp actuating mechanism.

Stationary plate 20 is secured to axle housing 12 by a plurality of mounting bolts 56. A plurality of threaded channels 62 are provided in stationary plate 20 and are adapted to receive a portion of mounting bolts 56 therein. Axle housing 12 includes a mounting flange 58 extending radially outward therefrom, and mounting flange 58 includes a plurality of holes 60 therethrough adapted to receive mounting bolts 56. The number of threaded channels 62 provided in stationary plate 20 is equal to the number of mounting bolts 56 and holes 60 provided, and threaded channels 62 are adapted to align with holes 60. In certain embodiments, mounting flange 58 may include four holes 60, each hole 60 receiving a mounting bolt 56 therein. However, it will be appreciated by those skilled in the art that more or less mounting bolts may be used.

A mounting sleeve 64 is positioned on one side of mounting flange 58 opposite brake 10. Mounting sleeve 64 includes a plurality of mounting holes 66 adapted to receive mounting bolts 56 therethrough. The number of mounting holes 66 through mounting sleeve 64 is equal to the number of holes 60, threaded channels 62 and mounting bolts 56 provided. Mounting bolts 56 include a threaded portion 68 and a head 70 positioned on opposing ends. Mounting bolts 56 extend through mounting sleeve 64, mounting flange 58 and into threaded channels 62.

Figure 4:
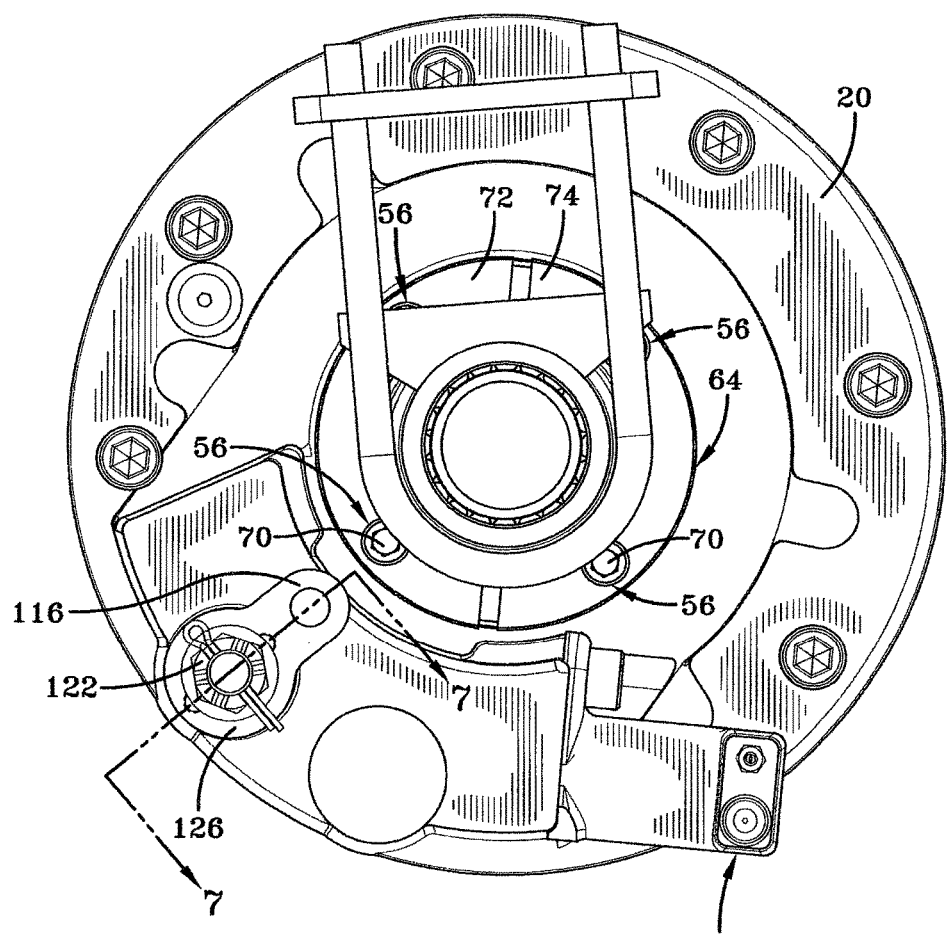
FIG. 4 is a front elevational view of the brake assembly of FIG. 2 showing the stationary plate and the mounting sleeves.
Figure 5:
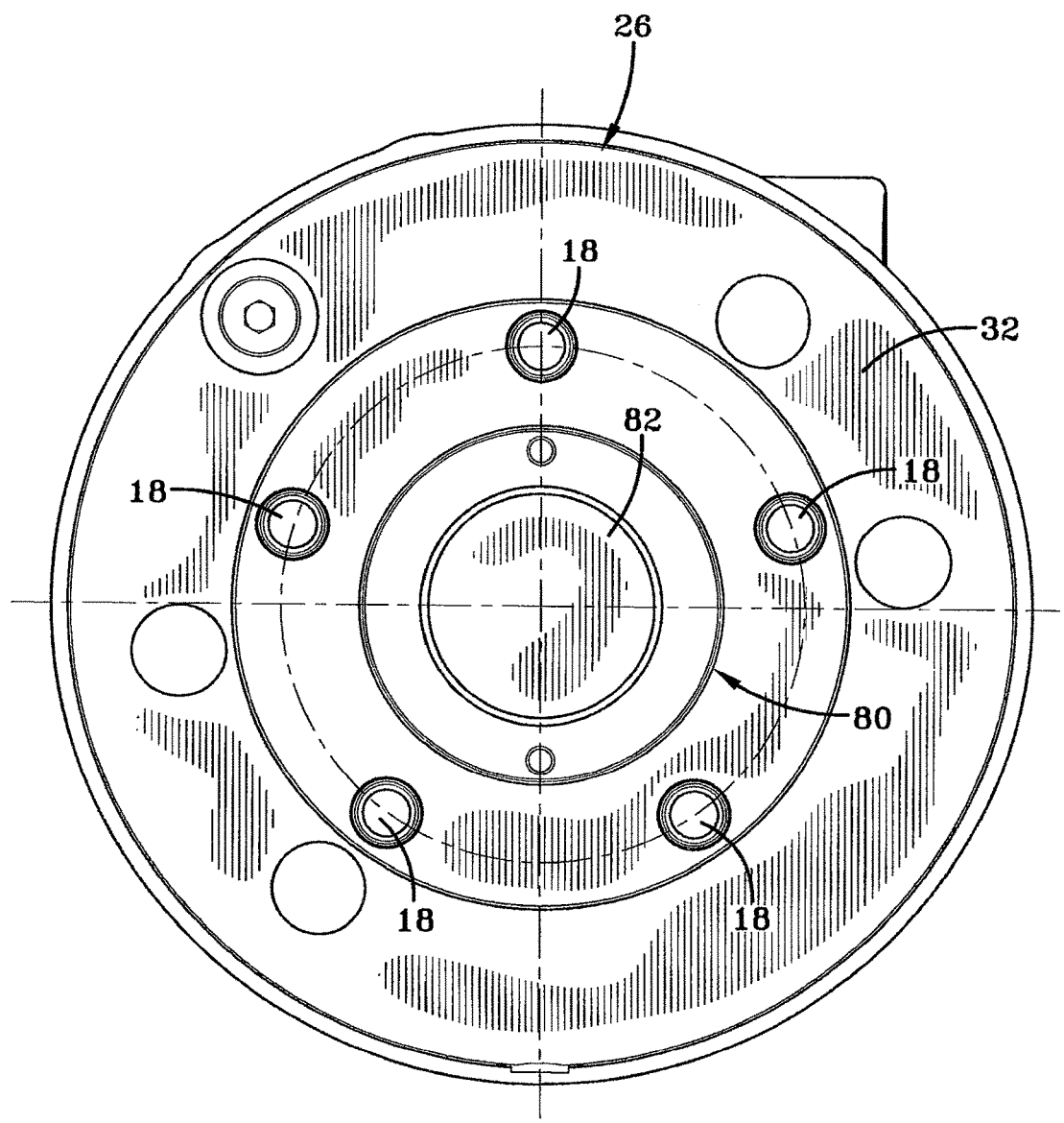
FIG. 5 is a rear elevational view of the brake assembly of FIG. 2 showing the rotating hub and the end cap.
Figure 6:
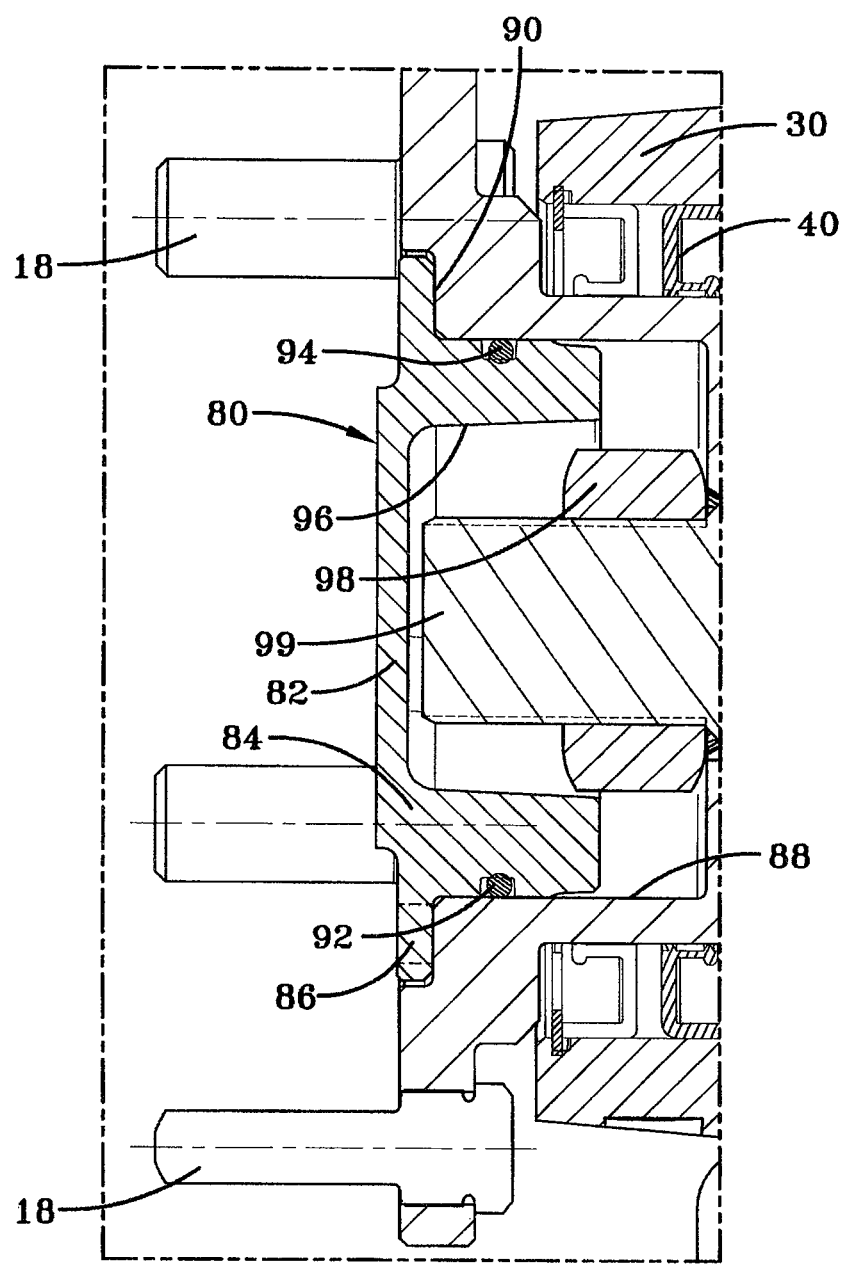
FIG. 6 is an enlarged sectional view of a portion of the brake assembly as indicated in FIG. 2.

The threaded portion 68 of mounting bolts 56 allows the bolt to be tightened, at head 70, to secure brake 10 to axle housing 12. While mounting sleeve 64 may be provided in a variety of forms, it is contemplated that the mounting sleeve may be provided in two portions: a first portion 72 and a second portion 74 (FIG. 4). Providing mounting sleeve 64 in two portions facilitates easy installation around axle housing 12, as will be appreciated by those skilled in the art.

The inclusion of mounting sleeve 64 allows the head 70 of mounting bolts 56 to be displaced from mounting flange 58. This displacement alleviates the need to provide a flat portion on the outer radial surface of head 70, as is required in conventional braking systems adapted to be secured to an axle housing flange as shown in FIG. 1. The inclusion of threaded channels 62 in stationary plate 20 alleviates the need for nuts positioned internally of stationary plate 20, as shown in FIG. 1 and as included in prior art designs. This distinction is significant in that it allows for use of a wet brake including lubricating and cooling fluid within an inner chamber without causing difficulties during installation and removal of the brake 10 from the axle housing 12.

The brake 10, axle 14 and hub 16 assembly may further include an end cap 80 that is received within an opening in hub 16. End cap 80 includes a planar face 82, a generally cylindrical body 84 and a flange 86 extending outwardly from the body 84. Body 84 is received in an opening 88 in hub 16. Flange 86 engages an annular lip 90 surrounding opening 88 to align and position the end cap 80 within the opening. End cap 80 may be secured within opening 88 by the vehicle wheel positioned on the lug bolts 18 of hub 16. Flange 86 has a diameter that is larger than the standard diameter of the central opening through a wheel, thereby preventing it from passing therethrough. Alternatively, mechanical fasteners (not shown) may be used to secure end cap 80 within opening 88 of hub 16. An annular O-ring 92 is provided within an annular channel 94 on a exterior surface of body 84. O-ring 92 creates a seal between body 84 and an interior surface of opening 88. Thus, water is prevented from entering the spline of hub 16 and traveling to the interior components of the brake.

The interior of body 84 of end cap 80 may include a casted pocket 96 that encompasses a nut 98 received on a threaded end 99 of the axle 14. The casted pocket 96 includes a flat surface that aligns with one of the flat surfaces on the outer radial surface of the nut 98. Thus, nut 98 is prevented from rotating relative to end cap 80 and axle 14.

Figure 7:
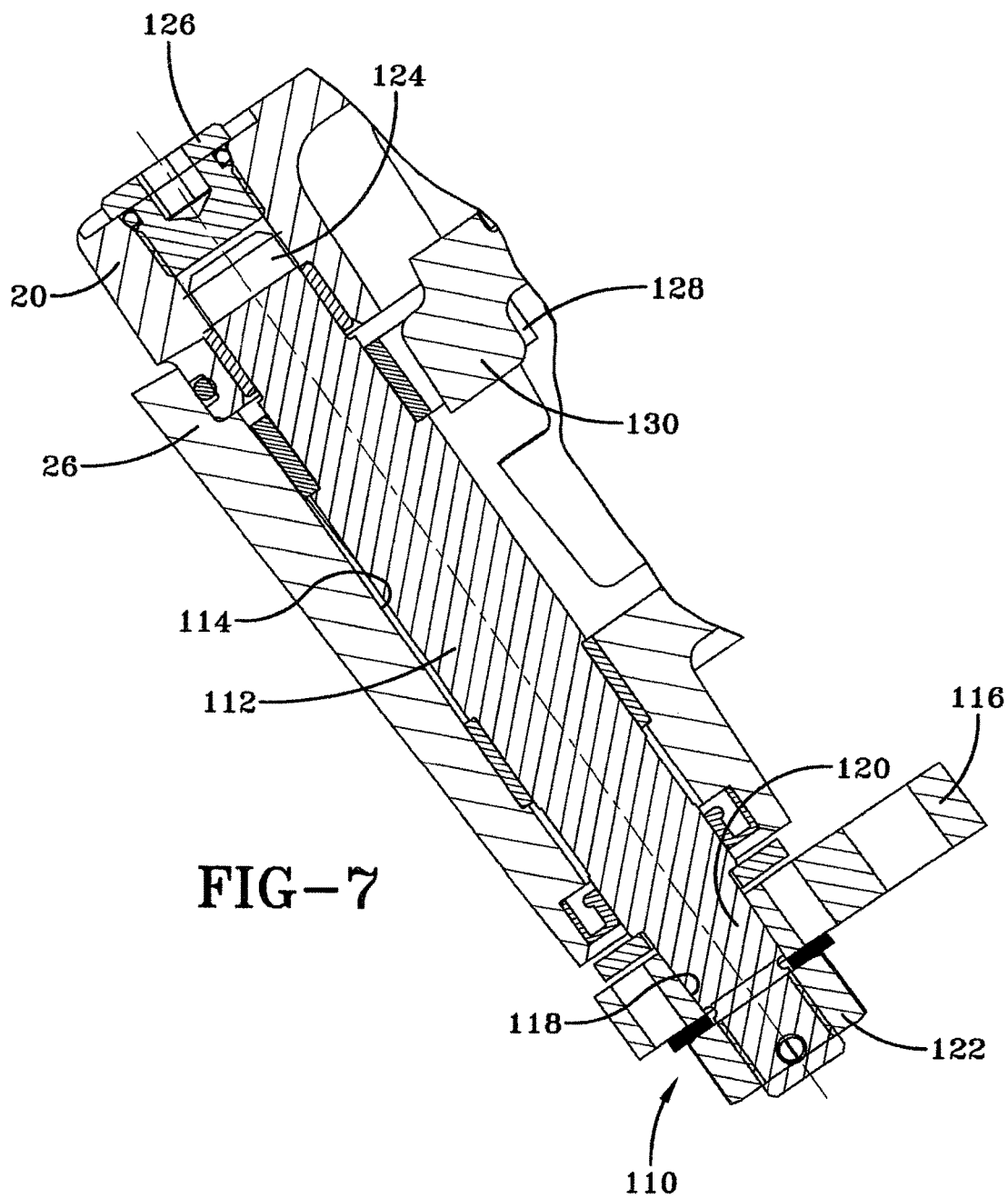
FIG. 7 is a sectional view of the parking brake actuating mechanism taken substantially along line 6-6 of FIG. 4.

As shown in FIG. 7, brake 10 may also include a parking brake actuating mechanism 110 that is adapted to actuate the brake and apply a braking force to hub 16. It should be appreciated that parking brake actuating mechanism 110 is a second actuating mechanism that is provided along with the hydraulic cylinder assembly 53. Actuating mechanism 110 includes a shaft 112 positioned in a bore 114, which passes through both stationary plate 20 and cover plate 26. A lever 116 is secured to an end of shaft 112 protruding from bore 114 adjacent to cover plate 26. Lever 116 is secured to the vehicle's parking brake actuation assembly.

Lever 116 includes a tapered hole 118 that fits over a matching tapered journal 120 on the end of shaft 112. A lever assembly nut 122 is received on the end of shaft 112 on the outside of lever 116 and, when tightened, acts to secure lever 116 on shaft 112. Tapered hole 118 and tapered journal 120 provide infinite lever location and adjustment for the parking brake feature. Lever 116 may be rotated to a specific orientation on shaft 112 and, when lever assembly nut 122 is tightened on shaft 112, lever 116 is fixed in place by the interaction of tapered hole 118 and tapered journal 120. A slot 124 is provided in the end of shaft 112 between lever 116 and lever assembly nut 122. Slot 124 provides a mechanism by which shaft 112 may be held stationary while adjustment is made to lever 116 and lever assembly nut 122. Slot 124 is concealed by an O-ring plug 126 and is positioned within the shaft 112.

A lobe 128 is pre-assembled to shaft 112 opposite lever 116. Lobe 128 engages an arm 130 on rotatable actuator 52. As will be appreciated by those skilled in the art, rotation of lever 116 by the vehicles parking brake actuating mechanism causes rotation of shaft 112 and lobe 128. Rotation of lobe 128 causes rotation of arm 130, thereby rotating rotatable actuator 52 to actuate brake 10 and generate a braking force on hub 16.

It is thus evident that a brake constructed as described herein accomplishes the objects of the present invention and otherwise substantially improves the art.

What is claimed is:

1. A brake adapted to be mounted to a flange on the wheel end of an axle assembly, the brake comprising a stationary plate, a plurality of holes in said stationary plate, a longitudinally extending mounting sleeve capable of being positioned longitudinally adjacent to the flange of the axle assembly on a side of said flange opposite said stationary plate, a plurality of holes through said mounting sleeve, each of said mounting sleeve holes being capable of aligning with a corresponding hole of said stationary plate holes for receiving a bolt therein, said mounting sleeve having an outer circumferential surface, the entirety of said outer circumferential surface of said mounting sleeve being devoid of contact with another component of the brake.

2. The brake of claim 1, wherein said stationary plate holes are threaded holes extending only partially through said stationary plate.

3. The brake of claim 1, wherein said mounting sleeve is generally annular in shape and includes an interior diameter approximately equal to but slightly larger than an exterior diameter of an axle housing adjacent the flange of the axle assembly.

4. The brake of claim 1, wherein said mounting sleeve is formed from two or more pieces to facilitate installation, wherein each of said pieces includes at least two holes therethrough.

5. The brake of claim 1, further comprising a cover plate that engages said stationary plate to form an inner chamber, and a seal positioned between said cover plate and said stationary plate to form a fluid-tight seal.

6. The brake of claim 5, further comprising a cooling and lubricating fluid within said inner chamber.

7. A brake adapted to be mounted to a flange on the wheel end of an axle assembly, the brake comprising a stationary plate, a plurality of holes in said stationary plate, a longitudinally extending mounting sleeve capable of being positioned longitudinally adjacent to the flange of the axle assembly on a side of said flange opposite said stationary plate, a plurality of holes through said mounting sleeve, each of said mounting sleeve holes being capable of aligning with a corresponding hole of said stationary plate holes for receiving a bolt therein, said mounting sleeve having an outer surface that is not in contact with another component of the brake, said outer surface of said mounting sleeve being devoid of teeth.

8. A brake adapted to be mounted to a flange on the wheel end of an axle assembly, the brake comprising a stationary plate, a plurality of holes in said stationary plate, a longitudinally extending mounting sleeve positioned on a side of said flange opposite said stationary plate, said mounting sleeve being formed from two or more pieces, each piece of said mounting sleeve having two or more holes therein, each of said mounting sleeve piece holes being capable of aligning with a corresponding hole of said stationary plate holes for receiving a bolt therein, each of said bolts including a head displaced from said flange, wherein said stationary plate holes are threaded holes extending only partially through said stationary plate, thereby allowing the brake to be devoid of nuts positioned internally of said stationary plate, said outer surface of said mounting sleeve being devoid of teeth.

9. The brake of claim 8, wherein said mounting sleeve is generally annular in shape and includes an interior diameter approximately equal to but slightly larger than an exterior diameter of an axle housing adjacent the flange of the axle assembly.

10. The brake of claim 8, said mounting sleeve having an outer surface that is devoid of a component positioned laterally adjacent thereto.

11. A brake adapted to be mounted to a flange on the wheel end of an axle assembly and having an outer surface, the brake comprising a stationary plate, a plurality of holes in said stationary plate, a longitudinally extending mounting sleeve positioned on a side opposite said stationary plate, said mounting sleeve being formed from two or more pieces, each piece of said mounting sleeve having two or more holes therein, each of said mounting sleeve piece holes being capable of aligning with a corresponding hole of said stationary plate holes for receiving a bolt therein, said mounting sleeve having an outer surface, the entirety of said outer surface of said mounting sleeve forming at least a part of the outer surface of the brake, said outer surface of said mounting sleeve being devoid of a component positioned laterally adjacent thereto.

12. The brake of claim 11, wherein said stationary plate holes are threaded holes extending only partially through said stationary plate.

13. The brake of claim 11, wherein said mounting sleeve is generally annular in shape and includes an interior diameter approximately equal to but slightly larger than an exterior diameter of an axle housing adjacent the flange of the axle assembly.

14. The brake of claim 11, further comprising a cover plate that engages said stationary plate to form an inner chamber, and a seal positioned between said cover plate and said stationary plate to form a fluid-tight seal.

15. The brake of claim 14, further comprising a cooling and lubricating fluid within said inner chamber.

16. A brake adapted to be mounted to a flange on the wheel end of an axle assembly and having an outer surface, the brake comprising a stationary plate, a plurality of holes in said stationary plate, a longitudinally extending mounting sleeve positioned on a side opposite said stationary plate, said mounting sleeve being formed from two or more pieces, each piece of said mounting sleeve having two or more holes therein, each of said mounting sleeve piece holes being capable of aligning with a corresponding hole of said stationary plate holes for receiving a bolt therein, said mounting sleeve having an outer surface, the entirety of said outer surface of said mounting sleeve forming at least a part of the outer surface of the brake, said outer surface of said mounting sleeve being devoid of teeth.

* * * * *